US009447701B2

(12) United States Patent
Omoruyi

(10) Patent No.: US 9,447,701 B2
(45) Date of Patent: Sep. 20, 2016

(54) DEVICE FOR GENERATING ELECTRICAL ENERGY BY MEANS OF AN ORC-CIRCULAR FLOW

(71) Applicant: SAXESS HOLDING GMBH, Kronberg im Taunus (DE)

(72) Inventor: John Omoruyi, Frankfurt am Main (DE)

(73) Assignee: SAXESS HOLDING GMBH, Kronberg im Taunus (DE)

( * ) Notice: Subject to any disclaimer, the term of this patent is extended or adjusted under 35 U.S.C. 154(b) by 29 days.

(21) Appl. No.: 14/410,661

(22) PCT Filed: Dec. 21, 2012

(86) PCT No.: PCT/EP2012/076672
§ 371 (c)(1),
(2) Date: Dec. 23, 2014

(87) PCT Pub. No.: WO2014/000830
PCT Pub. Date: Jan. 3, 2014

(65) Prior Publication Data
US 2015/0145256 A1    May 28, 2015

(30) Foreign Application Priority Data
Jun. 26, 2012   (DE) .................. 10 2012 210 803

(51) Int. Cl.
*F01K 9/00* (2006.01)
*F01K 25/08* (2006.01)
(Continued)

(52) U.S. Cl.
CPC ................. *F01K 9/00* (2013.01); *F01D 15/10* (2013.01); *F01K 9/003* (2013.01); *F01K 25/08* (2013.01); *H02K 7/1823* (2013.01)

(58) Field of Classification Search
CPC ..... F01D 15/10; H02K 7/1823; Y02E 10/22; F01K 25/08; F01K 25/10; F01K 25/06
USPC .................................. 290/52, 54, 43; 60/671
See application file for complete search history.

(56) References Cited

U.S. PATENT DOCUMENTS 3,073,964 A * 1/1963 Csanady, Jr. ......... F01D 13/003
290/4 R
6,185,836 B1 * 2/2001 Zaoralek .............. D21G 1/0266
34/119

(Continued)

FOREIGN PATENT DOCUMENTS

CN          101761553 A      6/2010
DE    10 2005 014 959 A1    10/2006

(Continued)

OTHER PUBLICATIONS
International Search Report of PCT/EP2012/076672, mailed Apr. 4, 2013.

*Primary Examiner* — Tulsidas C Patel
*Assistant Examiner* — Charles Reid, Jr.
(74) *Attorney, Agent, or Firm* — Collard & Roe, P.C.

(57) ABSTRACT

The present invention relates to a device for performing an Organic Rankine Cycle-process (ORC-process), comprising a first circular flow in which a first process fluid is conducted, having an evaporator for evaporating the first process fluid, an expansion machine located downstream of the evaporator for expanding the evaporated first process fluid, wherein the expansion machine is connectable to a generator for generating electrical energy, a first condenser located downstream of the expansion machine for condensing the expanded first process fluid, and a first fluid energy machine located downstream of the first condenser for increasing the pressure of the condensed first process fluid and for transporting the first process fluid to the evaporator that is located downstream of the first fluid energy machine. The term fluid energy machine is to be understood to describe a machine that exchanges mechanical work with the process fluid.

11 Claims, 5 Drawing Sheets

(51) Int. Cl.
*H02K 7/18* (2006.01)
*F01D 15/10* (2006.01)

(56) References Cited

U.S. PATENT DOCUMENTS

| | | | | |
|---|---|---|---|---|
| 6,857,268 B2* | 2/2005 | Stinger | ................... | F01K 25/08 60/651 |
| 7,062,913 B2* | 6/2006 | Christensen | ............ | F01K 25/08 60/651 |
| 7,841,306 B2* | 11/2010 | Myers | ..................... | F01D 15/10 122/406.5 |
| 8,400,005 B2* | 3/2013 | Huber | ..................... | F01D 15/10 290/52 |
| 8,567,195 B2* | 10/2013 | Nash | ....................... | F01K 9/003 60/641.1 |
| 8,601,814 B2* | 12/2013 | Kaplan | ................... | F01K 25/08 60/641.2 |
| 8,875,514 B2* | 11/2014 | Pesce | ..................... | F01K 23/065 290/52 |
| 2003/0007705 A1 | 1/2003 | Bosen et al. | | |
| 2007/0007771 A1 | 1/2007 | Biddle et al. | | |
| 2008/0168772 A1* | 7/2008 | Radcliff | ................... | F01K 25/08 60/651 |
| 2008/0246281 A1* | 10/2008 | Agrawal | ............... | F01D 15/005 290/52 |
| 2008/0252078 A1* | 10/2008 | Myers | .................... | F01D 15/10 290/52 |
| 2009/0015012 A1* | 1/2009 | Metzler | ................... | F01D 15/10 290/52 |
| 2009/0235664 A1* | 9/2009 | Smith | ..................... | F01K 27/02 60/671 |
| 2009/0277400 A1* | 11/2009 | Conry | ....................... | F01N 5/02 123/2 |
| 2010/0071368 A1* | 3/2010 | Kaplan | ................... | F01K 7/025 60/651 |
| 2010/0101231 A1* | 4/2010 | Westmeier | ............... | F01K 23/10 60/783 |
| 2010/0156111 A1* | 6/2010 | Pesce | ..................... | F01K 23/065 290/1 A |
| 2010/0212316 A1 | 8/2010 | Waterstripe et al. | | |
| 2010/0258251 A1* | 10/2010 | Nitschke | ................. | F03G 7/005 159/48.1 |
| 2011/0016863 A1* | 1/2011 | Ernst | ....................... | F01K 25/10 60/645 |
| 2011/0072820 A1* | 3/2011 | Finkenrath | ............... | F01K 9/003 60/655 |
| 2011/0115226 A1* | 5/2011 | Logan | ....................... | F03G 6/00 290/52 |
| 2011/0138809 A1* | 6/2011 | Ramaswamy | .......... | F01K 25/10 60/641.2 |
| 2011/0204655 A1* | 8/2011 | Waibel | ..................... | F25B 6/04 290/1 R |
| 2011/0314818 A1* | 12/2011 | Breen | ..................... | F01K 25/10 60/676 |
| 2012/0047890 A1* | 3/2012 | Regelman | ............... | F01K 25/10 60/651 |
| 2012/0111004 A1* | 5/2012 | Conry | .................... | F01K 13/00 60/641.2 |
| 2012/0192563 A1* | 8/2012 | Kauffman | ............... | F01K 25/10 60/671 |
| 2012/0272648 A1* | 11/2012 | Ast | ......................... | F01K 13/00 60/645 |
| 2012/0299311 A1* | 11/2012 | Biederman | .............. | F01K 25/10 290/40 B |
| 2012/0306206 A1* | 12/2012 | Agrawal | ............... | F04D 25/0606 290/52 |
| 2013/0213040 A1* | 8/2013 | Goswami | .................. | F01K 7/22 60/647 |
| 2013/0234439 A1* | 9/2013 | Mirmobin | ............... | F23D 14/12 290/52 |

FOREIGN PATENT DOCUMENTS

| | | | | |
|---|---|---|---|---|
| DE | 102005014959 A1 * | 10/2006 | ............ | F01K 9/003 |
| DE | 10 2007 035 058 A1 | 1/2009 | | |
| DE | 20 2009 002 710 U1 | 8/2009 | | |
| DE | 10 2009 049 338 A1 | 5/2011 | | |
| EP | 1 273 764 A1 | 1/2003 | | |
| WO | 2008/124868 A1 | 10/2008 | | |
| WO | WO 2008124868 A1 * | 10/2008 | ........... | F01K 17/005 |
| WO | 2012/049259 A1 | 4/2012 | | |
| WO | WO 2012049259 A1 * | 4/2012 | ............ | F01K 25/103 |

\* cited by examiner

DEVICE FOR GENERATING ELECTRICAL ENERGY BY MEANS OF AN ORC-CIRCULAR FLOW

CROSS REFERENCE TO RELATED APPLICATIONS

This application is the National Stage of PCT/EP2012/076672 filed on Dec. 21, 2012, which claims priority under 35 U.S.C. §119 of German Application No. 10 2012 210 803.3 filed on Jun. 26, 2012, the disclosures of which are incorporated by reference. The international application under PCT article 21(2) was not published in English.

The present invention relates to a device for performing an ORC-process, comprising a first circular flow in which a first process fluid is conducted, having an evaporator for evaporating the first process fluid, an expansion machine located downstream of the evaporator for expanding the evaporated first process fluid, wherein the expansion machine is connectable to a generator for generating electrical energy, a first condenser located downstream of the expansion machine for condensing the expanded first process fluid, and a first fluid energy machine located downstream of the first condenser for increasing the pressure of the condensed first process fluid and for transporting the first process fluid to the evaporator that is located downstream of the first fluid energy machine. The term fluid energy machine is to be understood to describe a machine that exchanges mechanical work with the process fluid.

ORC-processes are known for a long time and are applied when the available temperature gradient between a heat source and a heat sink is too small for an expansion machine driven by water vapor. Application areas of ORC-processes are e.g. waste heat or residual heat of production processes, industrial plants, chimneys, biogas plants, block heat and power plants and where residual heat is provided having a temperature level of approximately 80 to 250° C. and higher. Known ORC-processes are e.g. disclosed in DE 10 2009 049 338 A1 or DE 10 2007 035 058 A1. The expansion machines usually drive a generator for generating electrical energy, either used in the plant or fed into the public power grid.

Due to the low electrical efficiency below 10% ORC-processes have not enjoyed a large-scale spreading as the investments needed for their implementation exceed the achievable savings by far. Thus, in the majority of cases the available residual heat is released to the environment without performing an ORC-process which is not optimal for economical and ecological reasons. Particularly in view of the sustainable stewardship of available energy there is a big need to use the energy included in the residual head at its best. The known ORC-processes fulfill these requirements only to a limited extend, as even in view of a sustainable stewardship of available heat the low efficiency mentioned above is too much of a drawback.

As initially mentioned production processes, industrial plants, chimneys, biogas plants, block heat and power plants are application areas of ORC-processes to use the released waste heat or residual heat for providing electrical energy. In most cases these plants are backfitted with ORC-devices so that the compact design of ORC-devices plays an important role. In many cases the backfitting with known ORC-devices fails due to shortage of available space.

It is therefore an aim of the present invention to further develop the device as initially described in a way that the efficiency is increased to an extent enabling the economic use of the energy contained in the residual heat. Further the device should get along with limited available space and should have a compact design so that existing plants can be backfitted as easy as possible.

The aim is reached in that the device initially described further comprises a second circular flow in which a second process fluid is conducted through the first condenser and is evaporated therein, wherein the second circular flow comprises a second fluid energy machine located downstream of the first condenser for compressing the evaporated second process fluid, a second condenser located downstream of the second fluid energy machine for condensing the evaporated second process fluid, wherein the first process fluid can flow through the second condenser, and a throttle located downstream of the second condenser for throttling the condensed second process fluid, wherein the expansion machine is connectable with the generator by a shaft without gearing mechanism, i.e., gearless.

In ORC-processes known in the prior art heat is withdrawn from the expanded first process fluid by cooling against the environment, e.g. by using cooling towers which consume energy themselves. The withdrawn heat is lost unused. Further substantial negative impacts arise from relatively high ambient temperatures, e.g. in regions near the equator, as the ambient temperatures define the lower temperature level and thus the usable temperature gradient between the heat source and the heat sink. Consequently the residual heat is lost without having used the energy contained therein.

The heat transfer conducted in the first condenser thus causes the condensation of the first process fluid and the heating of the second process fluid. In the second circular flow the second process fluid is transported to the heat exchanger through which the first process fluid is flowing. At this point heat is withdrawn from the second process fluid and is used for heating the first process fluid. For enabling the heat transfer the second process fluid has to be compressed to the pressure of the first process fluid in the heat exchanger. To this end the second fluid energy machine is used.

The gearless connection of the expansion machine to the generator enables the saving of room needed for the gear mechanism so that the inventive device is very compact and needs little available space. Thus the inventive device can be integrated more easily into existing plants where waste heat and residual heat should be used. Beyond that gear mechanisms cause power losses so that the configuration without gear mechanism increases the efficiency of the device for performing an ORC-process compared to devices comprising a gear mechanism. Gear mechanisms often cause disturbances as they are prone to wear. Therefore the configuration without a gear mechanism has the further advantage that the operation of the inventive device is more reliable.

In an advantageous embodiment the bearing of the shaft comprises a tandem roller bearing configuration. Typically, two bearings located spaced apart from each other by a certain distance are used for bearing the shaft, e.g. using radial bearings. Further, the shaft has to be supported axially. In a connection between the turbine and the generator without gear mechanism it is not possible to increase or decrease the rotational speed provided by the turbine to the optimal rotational speed of the generator. The turbines used in ORC-processes usually run at very high rotational speeds, wherein 60 000 rpm is not uncommon. Next to the rotor of the generator the impeller of the turbine is also arranged on the same shaft, the latter being simply or overhung supported leading to a high mechanical and thermal load of the bearings.

Therefore known ORC-devices are equipped with magnetic or air bearings. Magnetic bearings are expensive and further consume power leading to a reduction of the overall efficiency of the ORC-device. Air bearings have the disadvantage that the air cushion on which the shaft is supported is relatively unstable. In case of failure of the air cushion the ORC-device is suffering great damage that cannot be rectified or only with big effort. These disadvantages can be counteracted by a tandem roller bearing configuration. A tandem roller bearing configuration is a bearing configuration in which at least one bearing is replaced by double or multiple row bearings. The shaft can be supported radially and axially by two roller bearing units, at the same time the initial costs in particular compared to magnetic bearings are significantly lower and the efficiency is not lowered by the power consumption. Compared to conventional roller bearings bearing damages can be reduced so that the ORC-device can be operated more reliably as the tandem roller bearing configuration can better resist emerging thermal and mechanical loads. Further the tandem roller bearing has the advantage that it only needs little available space, thereby promoting a compact construction of the turbine and the generator. Moreover the tandem roller bearing allows for a maintenance-free bearing as the lubrication grease does not have to be replaced, thereby reducing the maintenance costs.

In a preferred embodiment the expansion machine is realized as a turbine and comprises a turbine housing that is connectable to a generator housing of the generator. The embodiment of the expansion machine as a turbine is the method of choice to operate an ORC-process. The integration of the turbine with the generator to one physical unit reduces the required space, leading to a very compact physical unit that can easily be integrated into existing plants.

Preferably the turbine comprises a first impeller having a number of first impeller vanes, the first impeller being arranged on the shaft on which a rotor of the generator is arranged. In operation of the ORC-process the impeller rotates the shaft, the shaft rotating the rotor of the generator without interposing further physical units, thereby generating electrical energy. The turbine and the generator are preferably adjusted to each other in a way that the generator can be optimally operated at the usually expected rotational speed of the generator. The number of the physical units is thus reduced, thereby reducing the required space and increasing the reliability of the device.

In a preferred embodiment the turbine comprises a first guide wheel having a number of first guide wheel vanes and a first impeller having a number of first impeller vanes. Amongst others due to the aim to provide the inventive device as compact as possible a radially blown turbine is advantageous. The guide wheel vanes enable the process fluid to optimally blow the impeller vanes. The efficiency is hereby increased so that the inventive device as a whole can be operated more efficiently.

A further embodiment of the inventive device is distinguished in that the turbine comprises a second impeller and a second guide wheel having a number of recirculation vanes and a number of second impeller vanes. A flow profile is conceivable in which the process fluid is radially flowing into the turbine, is diverted to the first impeller vanes by the first guide wheel vanes of the first impeller and is radially flowing inward through the channel defined by the impeller vanes. Subsequently the process fluid is axially flowing to the second guide wheel where it is again diverted radially outward by the recirculation vanes located on the upstream side. On the downstream side of the second guide wheel the process fluid is diverted to the second impeller vanes of the second impeller, thereby rotating the second impeller. Thus a two-stage turbine is realized, thereby increasing the efficiency of the inventive device. Naturally, not only two-stage turbines but three- or multi-stage turbines may be realized.

Preferably the generator housing comprises a generator cooling unit. It has been found that cooling of the generator housing has a plurality of advantages. The most important advantages are that the thermal stress of the rotor and the stator in operation of the generator can be reduced, thereby increasing the lifespan of the generator. Further the rotational speed of the generator may be increased so that a better efficiency is obtained. Further the magnetic field is temperature-dependent and decreases with increasing temperature. Thus, the generator cooling unit enables the maintenance of a strong magnetic field, thereby also increasing the efficiency of the generator or keeping the efficiency at a high level.

It is also preferred that the turbine housing comprises a turbine cooling unit. Also in this case the thermal stress of the components of the turbine is reduced, thereby increasing the lifespan of the turbine. Depending on the design the cooling unit may in particular cool the bearing configuration leading to decisive improvements of the reliability of the turbine.

A further embodiment of the inventive device is characterized in that an expansion tank is located downstream of the expansion machine for expanding the first process fluid. In ORC-processes the process fluid is completely or partially existent in the liquid state upon exit from the expansion machine. In case the process fluid is guided in tubes of the first circular flow having a relatively small diameter a backpressure may be generated in the expansion machine, having negative effects on the efficiency of the expansion machine. The expansion tank provides an expansion volume in which the backpressure can be reduced without reaching back into the expansion machine so that the efficiency of the expansion machine is not negatively influenced.

The inventive embodiment is further developed by one or more further circular flows in each of which a further process fluid is conducted, the further process fluid or fluids are heated by one or more first heat exchangers through which the first process fluid or fluids can flow, wherein the one or more further circular flows comprise a further fluid energy machine located downstream of the first heat exchanger for compressing the heated further process fluid or fluids, a second heat exchanger located downstream of the further fluid energy machine for transferring heat from the compressed further process fluid or fluids to the first process fluid, wherein the first process fluid can flow through the second heat exchanger, and a further throttle located downstream of the second heat exchanger for throttling the condensed further process fluid or fluids. During the condensation of the first process fluid in the first condenser only a certain heat quantity can be withdrawn from the first process fluid. The heat quantity is amongst others restricted by the thermodynamic properties of the second process fluid. Insofar the first process fluid may still contain a certain amount of heat that depending on the application may significantly be above the temperature level of the environment. This heat quantity can be used in that the third process fluid is evaporated, wherein the heat transferred to the third process fluid is added to the first process fluid at a suitable location. It has to be considered that the process fluid releasing heat has to be at least under the same pressure as the receiving process fluid. As a result the further fluid energy machine has to compress the third process fluid before entry into the second heat exchanger at least to the pressure of the first process fluid in the second heat exchanger. Thereby the efficiency of the ORC-process may be further increased.

Preferably the second process fluid or one of the further process fluids can flow through the generator cooling unit. In this embodiment the heat that is withdrawn from the generator is added to the first process fluid at a suitable location so that the withdrawn heat does not stay unused but is still available in the process. The efficiency of the device is thus further increased.

In a further embodiment the device comprises a first further circular flow in which a first further process fluid is conducted, the first further process fluid is flowing through the generator cooling unit and is thereby heated, wherein the first further circular flow comprises a further fluid energy machine located downstream of the generator cooling unit for compressing the heated first further process fluid, a second heat exchanger located downstream of the further fluid energy machine for transferring heat from the compressed first further process fluid to the first process fluid, wherein the first process fluid can flow through the second heat exchanger, and a further throttle located downstream of the second heat exchanger for throttling the condensed first further process fluid.

In this embodiment the heat generated during the operation of the generator can be withdrawn from the generator and transferred to the first process fluid. As already explained above the efficiency of the generator is decreasing with increasing temperature so that cooling is meaningful anyway. In this embodiment the heat withdrawn from the generator can be used for preheating the first process fluid so that the ORC-process can be operated at a higher efficiency.

A further embodiment of the inventive device comprises a first further circular flow in each of which a first further process fluid is conducted, the first further process fluid is flowing through a heat transporting unit and is thereby heated, wherein the first further circular flow comprises a further fluid energy machine located downstream of the heat transporting unit for compressing the heated first further process fluid, a second heat exchanger located downstream of the further fluid energy machine for transferring heat from the compressed first further process fluid to the first process fluid, wherein the first process fluid can flow through the second heat exchanger, a further throttle located downstream of the second heat exchanger for throttling the condensed first further process fluid, and a second further circular flow in which a second further process fluid is conducted that can flow through the generator cooling unit and the heat transporting unit.

In general it is advantageous that the second and one or more further process fluids are evaporated in only one evaporator and are condensed in only one condenser. However, this leads to an increase in the needed components and tubes as no further heat exchangers may be integrated into the respective circular flows. In general it is advantageous to several times add heat to the second or to the one or more process fluids within the same circular flow using a plurality of heat exchangers. That is particularly true when the heat needed for evaporation is withdrawn from the first process fluid at a location where the heat cannot be transferred. In the second heat exchanger located downstream of the first heat exchanger there is the danger that the second or one of the further process fluids are already at least partly evaporated and a gas-liquid-mixture is present. Depending on the design of the generator cooling unit small channels may be provided the employed process fluid has to flow through. The vapor may however block the channels so that the flow is hindered. This problem may be solved in that a further circular flow is subdivided into a first and a second further circular flow so that it is possible to use different further process fluids that are chosen such that the respective further process fluid is flowing through the generator cooling unit in the liquid state only.

It is further preferred that the second process fluid or the further process fluid or the first further process fluid can flow through the turbine cooling unit. In this embodiment the heat that is withdrawn from the turbine is added to the first process fluid at a suitable location so that the withdrawn heat does not remain unused but is available for the process. Thus the efficiency of the device is further increased.

In a further development of the invention the second process fluid or the further process fluid or the first further process fluid can flow through the expansion tank cooling unit. In this development the heat that is withdrawn from the expansion tank upon cooling is added to the first process fluid at a suitable location. Thus the efficiency of the device is further increased.

A further aspect of the present invention relates to a turbine generator configuration for use in a ORC-circular flow, comprising a turbine having a turbine housing, and a generator having a generator housing, wherein the generator housing can be connectable to the turbine housing by a shaft without gear mechanism. This aspect thus relates to the use of the turbine generator configuration for performing an ORC-circular flow. The technical effects and advantages of this turbine generator configuration correspond to those that have been described with respect to the device. In particular it is referred to the reduced required installation space and the increased reliability.

Preferably the bearing of the shaft of the turbine generator configuration comprises a tandem roller bearing configuration. The technical effects and advantages of this turbine generator configuration correspond to those that have been described with respect to the corresponding embodiment of the device.

Preferably the turbine comprises a first impeller having a number of first impeller vanes, the impeller being arranged on the shaft on which a rotor of the generator is arranged. The technical effects and advantages of this turbine generator configuration correspond to those that have been described with respect to the corresponding embodiment of the device.

A further development of the turbine generator configuration the turbine comprises a first guide wheel having a number of first guide wheel vanes and a first impeller having a number of first impeller vanes. The technical effects and advantages of this turbine generator configuration correspond to those that have been described with respect to the corresponding embodiment of the device.

The turbine generator configuration is developed further in that the generator housing comprises a generator cooling unit and/or the turbine housing comprises a turbine housing cooling unit. The technical effects and advantages of this turbine generator configuration correspond to those that have been described with respect to the corresponding embodiment of the device.

In the following the present invention is explained in detail by means of preferred embodiments with reference to the attached drawings.

Figure 3:
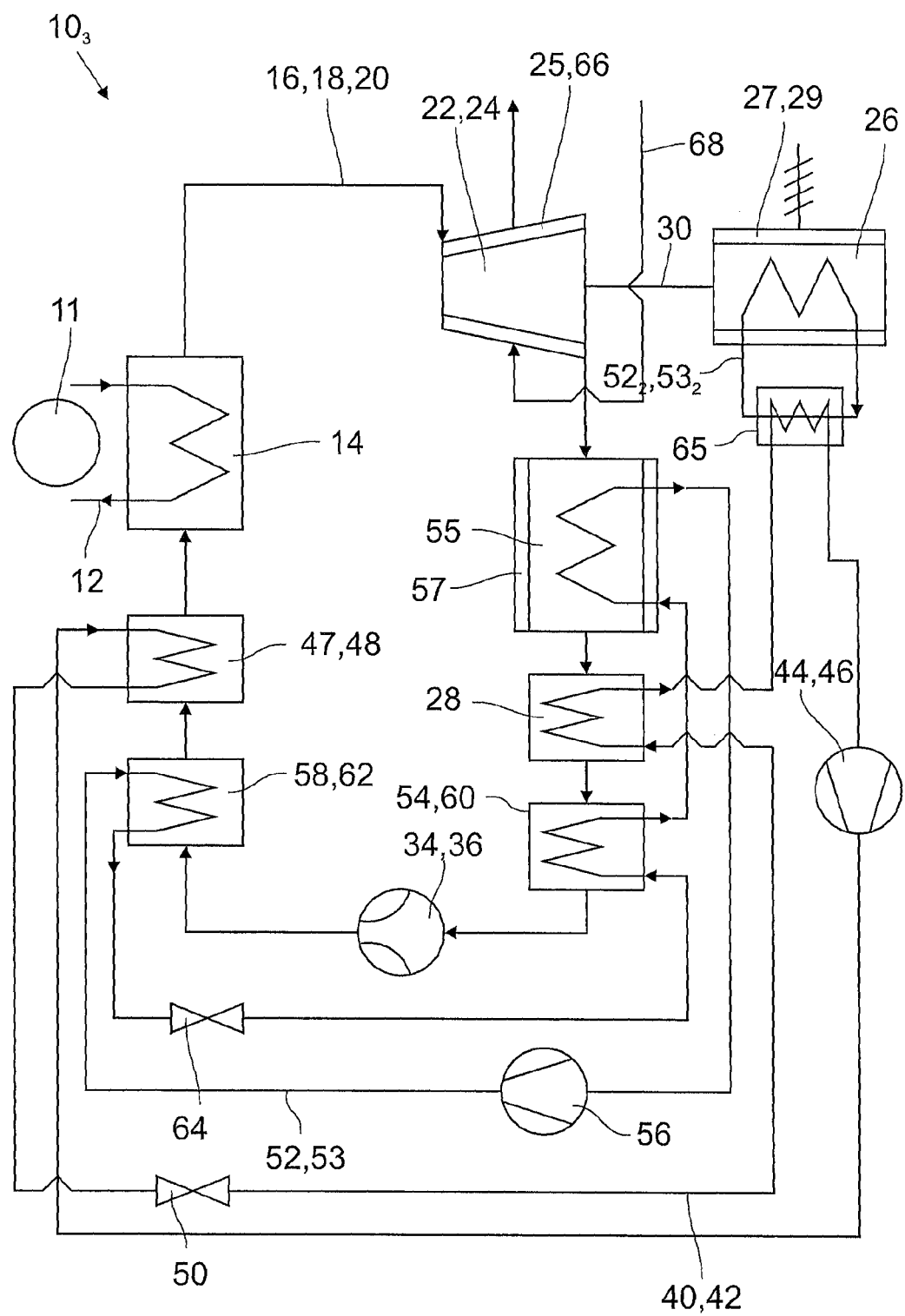
Figure 4:
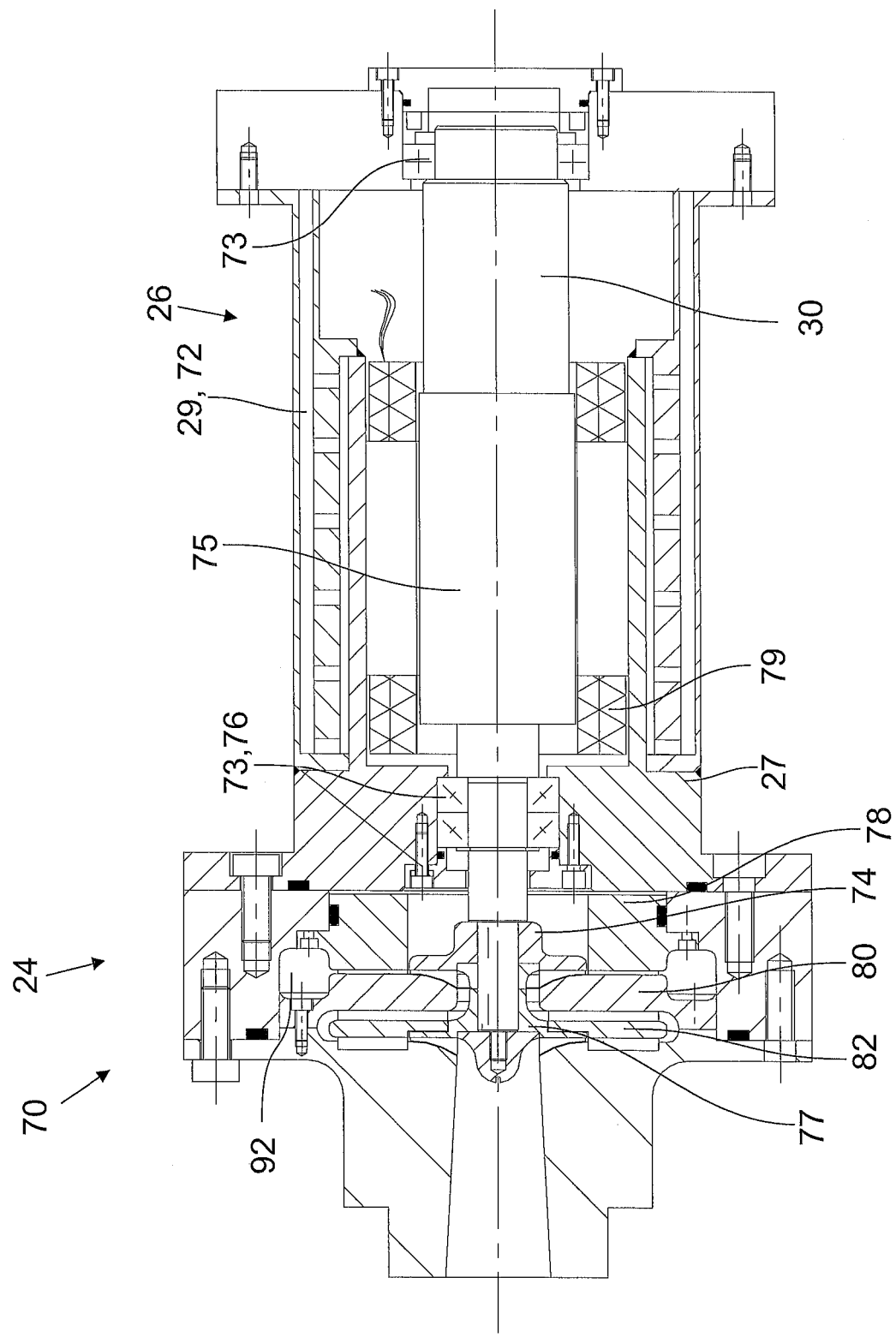
Figure 5:
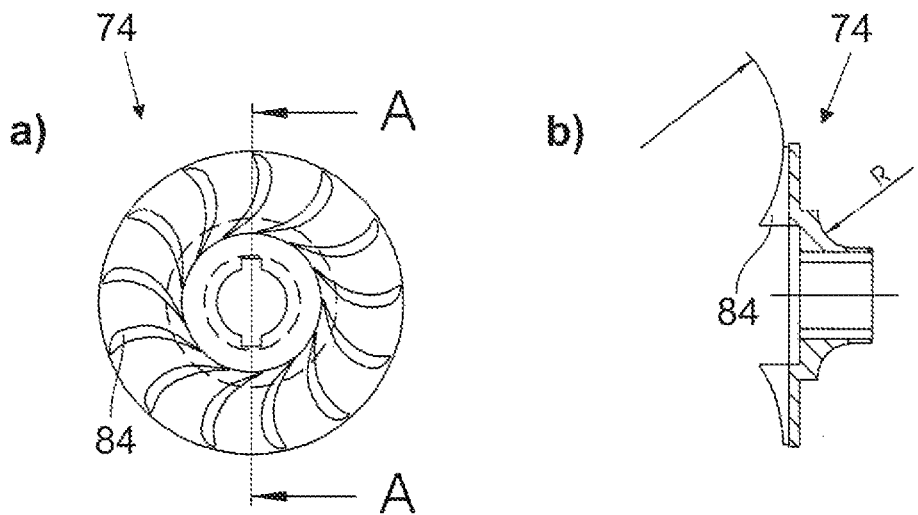
Figure 6:
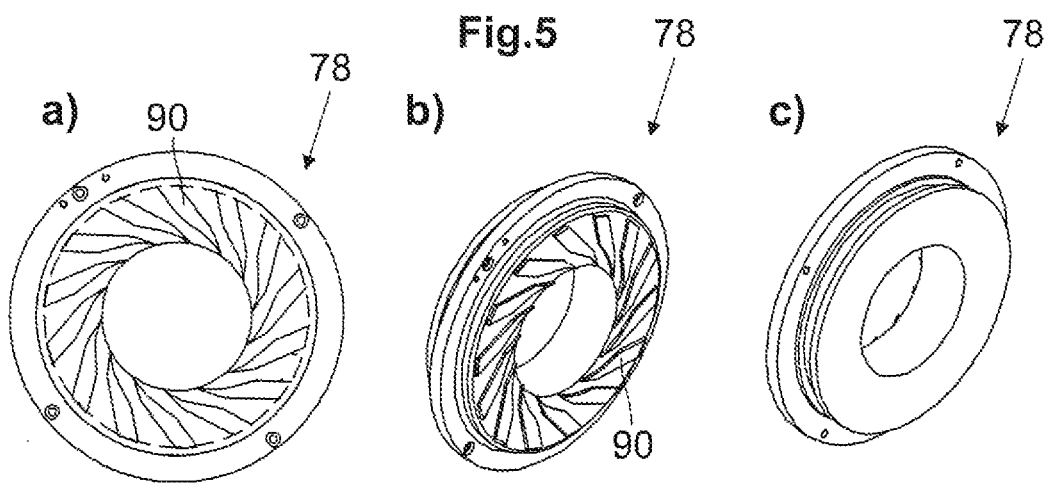
Figure 7:
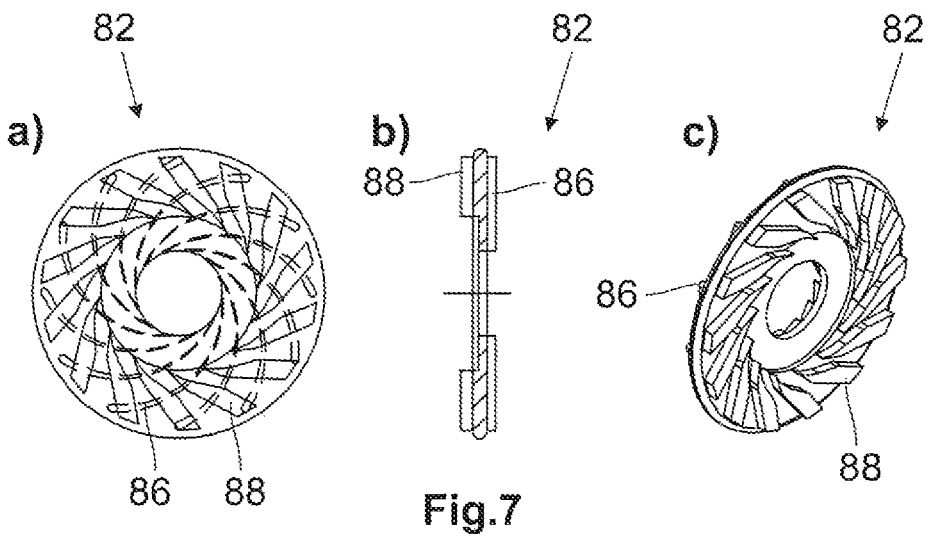

FIG. 3 shows a third embodiment of the inventive device, each of them by means of a principle drawing, FIG. 4 shows an inventive turbine generator configuration by means of a cross sectional view, FIG. 5a) shows an inventive impeller by means of a top view, FIG. 5b) shows the impeller shown in FIG. 5a) by means of a cross sectional view along the plane defined in FIG. 5a), FIG. 6a) shows an inventive first guide wheel by means of a perspective view, FIG. 6b) shows the first guide wheel of FIG. 6a) by means of a perspective view, FIG. 6c) shows the first guide wheel of FIGS. 6a) and 6b) by means of a perspective view, FIG. 7a) is a top view on an inventive second guide wheel, FIG. 7b) shows the second guide wheel according to FIG. 7a) by means of a side view, and FIG. 7c) shows the guide wheel of FIGS. 7a) and 7b) by means of a perspective view.

Figure 1:
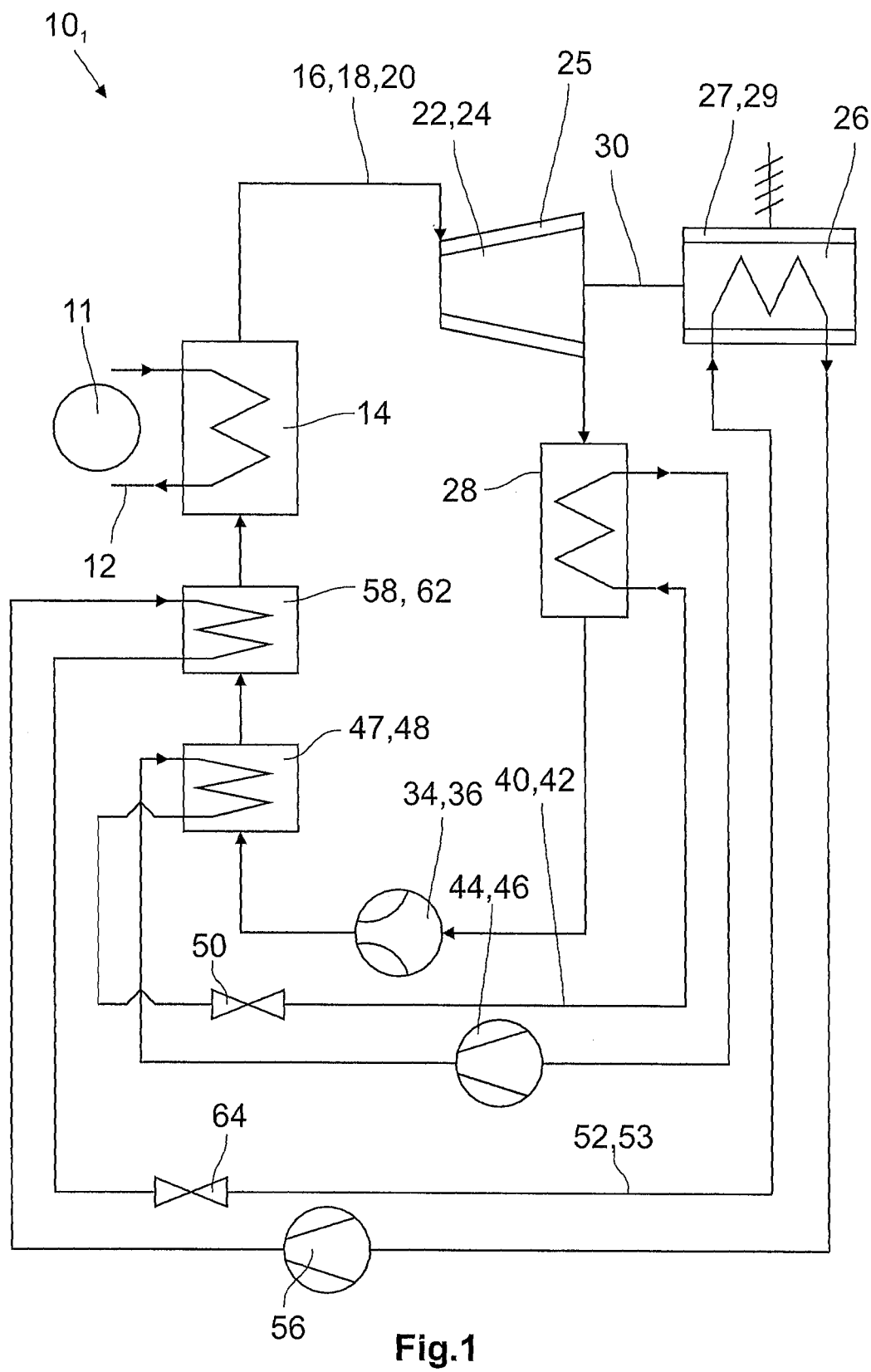
FIG. 1 shows a first embodiment of the inventive device.

In FIG. 1 a first embodiment of the inventive device $10_1$ for performing an ORC-process is shown by means of a schematic drawing. A heat source 11, e.g., an industrial plant, provides waste heat that is transferred to an evaporator 14 by means of a suitable carrier medium 12. The evaporator 14 is part of a first circular flow 16, in which a first process fluid 18 is guided. The direction of flow of the first process fluid 18 is designated by the arrows. The use of the terms "upstream" and "downstream" relates to the direction of flow of the respective circular flows. In the evaporator 14 the first process fluid 18 is evaporated by means of the heat delivered by the heat source 11. The evaporator 14 is connected to an expansion machine 22 by suitable pipes 20. The first process fluid 18 that is evaporated in the evaporator 14 is expanded in the expansion machine 22. In the shown embodiment the expansion machine 22 is realized as a turbine 24 having a turbine housing 25 and is connected to a generator 26 without a gearing mechanism. In the generator 26 the mechanical energy generated in the turbine 24 is converted into electrical energy. The generator 26 comprises a generator housing 27 to which the turbine housing 25 is connectable.

After having flown through the turbine 24 the expanded first process fluid 18 is guided to a first condenser 28 in which the expanded first process fluid 18 is condensed. For this purpose heat has to be withdrawn from the first process fluid 18 which is done by a second circular flow 40, in which a second process fluid 42 is transported in direction of the arrows what will be explained further in the following.

After having passed the condenser 28 the condensed first process fluid 18 is guided to a first fluid energy machine 34 that is transporting the first process fluid 18 within the first circular flow 16 and that generates an increase in pressure of the first process fluid 18. In the shown example the first fluid energy machine 34 is realized as a pump 36 which is particularly suited for conveying the liquid first process fluid 18. After that the first process fluid is guided to the evaporator 14, thereby closing the first circular flow 16.

The second process fluid 42 is flowing through a first condenser 28 in which the second process fluid 42 is heated or evaporated by the heat released from the first process fluid 18. Subsequently the heated or evaporated second process fluid 42 is guided to a second fluid energy machine 44 that is embodied as a compressor 46 in the shown embodiment. On one hand the compressor 46 is conducting the second process fluid 42 in the second circular flow, and on the other hand it is compressing the heated or the evaporated second process fluid 42. After that the second process fluid 42 is transported to a heat exchanger 47 the first process fluid 18 is flowing through. When the second process fluid 42 is evaporated in the first condenser 28 the heat exchanger 47 is embodied as a second condenser 48 in which the second process fluid 42 is condensed. In both cases the heat withdrawn from the second process fluid 42 is transferred to the first process fluid.

In the given example the second condenser 48 is located upstream of the evaporator 14 so that the first process fluid 18 is preheated in the second condenser 48 before entry into the evaporator 14. The heat quantity needed for evaporating the first process fluid is hereby reduced so that the ORC-process can also be conducted with a heat source 11 whose waste heat has a relatively low temperature level. After leaving the second condenser 48 the second process fluid 42 is guided to a throttle 50 where it is throttled and its pressure decreased. Later on the second process fluid 42 will be guided to the first condenser 28, hereby closing the second circular flow 40.

Further the device 101 comprises a further circular flow 52, in the given case a third circular flow 52 in which a further process fluid 53, in this case a third process fluid 53, is transported by a further fluid energy machine 56 within the third circular flow 52. The third process fluid 53 is flowing through a generator cooling unit 29 located in the generator housing 27 so that heat is transferred from the generator 26 to the further process fluid 53, thereby cooling the generator 26. The third process fluid 53 is thereby heated or evaporated. Downstream of the generator cooling unit 29 the third process fluid 53 is flowing through a second heat exchanger 58 or through a fourth condenser 62 the first process fluid 18 can flow through. At this point heat is transferred from the third process fluid 53 to the first process fluid 18, wherein the further fluid energy machine 56 compresses the third process fluid 53 at least to the pressure of the first process fluid 18 in the second heat exchanger 58. The second heat exchanger 58 is located downstream of the second condenser 48 and causes the transfer of heat from the third process fluid 53 to the first process fluid 18. If necessary the third process fluid 53 is subsequently throttled to a certain pressure in a further throttle 64. Due to the thermal process conducted in the third circular flow 52 the first process fluid 18 is preheated before reaching the evaporator 14 which leads to the fact that the heat quantity required for evaporation is further reduced. As a consequence the inventive design of the device 101 leads to a further improvement of the efficiency of the ORC-process.

Figure 2:
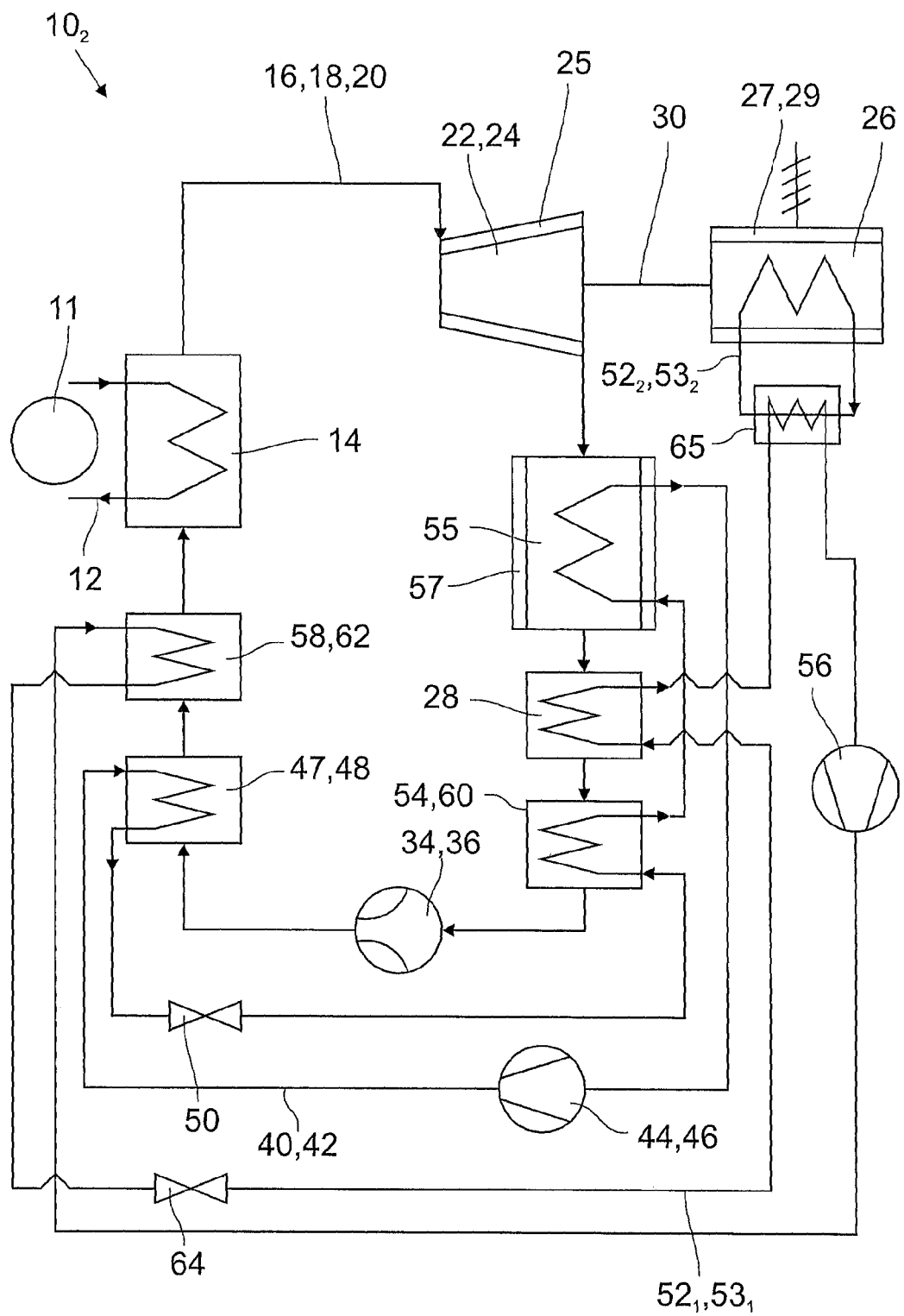
FIG. 2 shows a second embodiment of the inventive device.

In FIG. 2 a second embodiment of the inventive device $10_2$ for conducting or performing an ORC-process is shown. In this embodiment the device $10_2$ comprises all components of the first embodiment according to FIG. 1, however, it further comprises an expansion tank 55 comprising an expansion tank cooling unit 57 the first process fluid 18 is flowing through, wherein the expansion tank 55 is arranged downstream of the turbine 24 and prevents a backpressure of the expanded first process fluid 18 reaching back into the turbine 24. The first condenser 28 is arranged downstream of the expansion tank 55. Moreover, a first heat exchanger 54 is arranged in the first circular flow 16 located downstream of the condenser 28. The first process fluid 18 can flow through the first heat exchanger 54.

The second process fluid 42 can flow through the first heat exchanger 54 and the expansion tank cooling unit 57, the second process fluid 42 being guided in the second circular flow 40. The heat withdrawn from the first process fluid 18 in the first heat exchanger 54 and in the expansion tank cooling unit 57 is transferred to the to the first process fluid 18 in the heat exchanger 47, the latter may also be embodied as a second condenser 48 depending on the available heat quantity and the type of second process fluid employed.

In the second embodiment $10_2$ a further process fluid $53_1$ is flowing through the evaporator 28, the further process fluid $53_1$ being circulated inside a first further circular flow $52_1$. To this end, the further fluid energy machine 56 is used. A heat transporting unit 65 is arranged downstream of the evaporator 28, the first further process fluid $52_1$ flowing through the heat transporting unit 65. At the same time a second further process fluid $53_2$ is flowing through the heat transporting unit 65, the second further process fluid $53_2$ being circulated inside a second further circular flow $52_2$. For the sake of clarity a respective feed pump located in the second further circular flow $52_2$ is not shown. The second further process fluid $53_2$ is also flowing through the generator cooling unit 29 so that heat that is transferred to the second further process fluid $53_2$ upon cooling of the generator 26 is transferred to the first further process fluid $53_1$ inside the heat transporting unit 65. As already described with regard to the first embodiment of the inventive device $10_1$ this heat is transferred to the first process fluid 18 inside the second heat exchanger 58. The choice of the second further process fluid $53_2$ can be adjusted to the flow and temperature conditions in the generator cooling unit 29.

Depending on whether the heat quantity remaining in the first process fluid 18 after leaving the first condenser is big enough to evaporate the used third process fluid 53 the first heat exchanger 54 is embodied as a third condenser 60 in which the first process fluid 18 is condensed and the first further process fluid $53_1$ is heated. The second heat exchanger 58 is thus embodied as a fourth condenser 62 in which the first further process fluid $53_1$ is condensed and the first process fluid 18 is heated accordingly. After leaving the fourth condenser 62 the first further process fluid $53_1$ is guided to a further throttle 64 where it is throttled and the pressure decreased.

The device $10_2$ according to the second embodiment is comprised in total with four circular flows. It should be noted that the number of circular flows may be further increased. Moreover, it should be noted that the evaporators and the condensers are a specific type of heat exchangers in which the state of the treated process fluids is changed. It is also possible not to change the state of the treated process fluids so that the evaporators and the condensers are merely operated as heat exchangers.

In FIG. 3 a third embodiment of the inventive device $10_3$ is shown. To a large extent it equals the second embodiment, however, the turbine 24 comprises a turbine cooling unit 66 for cooling the turbine 24. In the third embodiment a coolant is flowing through the turbine cooling 66 so that the turbine 24 is cooled, however, the coolant is not circulated in the second circular flow 40 or in the further circular flow 52, which would however also be possible. In the shown embodiments the first further process fluid $53_1$ is flowing through the expansion tank 55, however, it would be possible that the second process fluid 42 is flowing through the expansion tank cooling unit 57 of the expansion tank 55 or that the expansion tank cooling unit 57 is not integrated into the second circular flow 40 or the further circular flow 57. The same is true for the generator cooling unit 29.

In FIG. 4 a turbine generator configuration 70 is shown comprising the turbine including the turbine housing 25 and the generator 26 including the generator housing 27. The generator housing 27 comprises channels 72 belonging to the generator cooling unit 29 through which the second process fluid 42, the further process fluid 53 or a coolant 68 are guided for cooling the generator 26. The turbine 24 and the generator 26 are connected to each other gearlessly wherein a first impeller 74, a second impeller 77 and a rotor 75 are arranged on the shaft 30, the rotor 75 interacting with a stator 79 of the generator 26. Further a first guide wheel 78 and an interim piece 80 are fixed to the turbine housing 25. Moreover a second guide wheel 82 is fixed to the shaft 30. The shaft is supported by a bearing 73 that comprises a tandem roller bearing configuration 76, comprising two bearings on the turbine side. It is thus possible to simply or overhung support the impellers and the guide wheels of the turbine 24.

In the FIGS. 5a) and 5b) the inventive first impeller 74 is shown comprising in total thirteen first impeller vanes 84. The second impeller 77 is almost identically designed as the first impeller 74 so that the FIGS. 5a) and 5b) may be used for the demonstration of the second impeller 77. The reference numbers of the first impeller vanes 84 are also valid for the second impeller vanes.

In the FIGS. 6a) to 6c) the inventive first guide wheel 78 is shown in which comprises in total fourteen first guide wheel vanes 90.

In the FIGS. 7a) to 7c) the inventive second guide wheel 82 is shown, comprising in total twelve recirculation vanes 86 that are displayed as dashed in FIG. 7a), and fourteen second guide wheel vanes 88.

In operation of the ORC-circular flow the first process fluid 18 is introduced radially into the turbine housing 25 and reaches an annular space 92 (cf. FIG. 4) that is formed by the turbine housing 25, the interim piece 80 and the first guide wheel 78. From the annular space 92 the first process fluid 18 is guided to the first guide wheel vanes 90 determining the path of the first process fluid 18 so that the first process fluid is optimally flowing to the first impeller vanes 84, thereby rotating the first impeller 74 and consequently the shaft 30 and the rotor 75. When flowing through the first impeller vanes 84 the first process fluid 18 is flowing radially inward and subsequently slightly axially so that it hits the side of the second guide wheel 82 comprising the recirculation vanes 86. The recirculation vanes 86 guide the first process fluid 18 radially outward and the second guide wheel vanes 88 of the second guide wheel 82 guide the first process fluid 18 inward so that the impeller vanes 84 of the second impeller 77 is optimally hit by the first process fluid 18 to further convert the kinetic energy of the first process fluid 18 into rotation energy which is then converted into electrical energy. By means of this two-stage design of the turbine 24 the kinetic energy of the first process fluid 18 is used in a better way compared to a one-step design, thereby further increasing the efficiency of the inventive device $10_3$.

REFERENCE SIGNS

10, $10_1$ to $10_3$ Device
11 heat source
12 carrier medium
14 evaporator
16 first circular flow
18 first process fluid
20 pipe
22 expansion machine
24 turbine
25 turbine housing
26 generator
27 generator housing
28 first condenser 29 generator cooling unit
30 shaft
34 first fluid energy machine
36 pump
40 second circular flow
42 second process fluid
44 second fluid energy machine
46 compressor
47 heat exchanger
48 second condenser
50 throttle
52, $52_1$, $52_2$ further circular flow
53, $53_1$, $53_2$ further process fluid
54 first heat exchanger
55 expansion tank
56 further fluid energy machine
57 expansion tank cooling unit
58 second heat exchanger
60 third condenser
62 fourth condenser
64 further throttle
65 heat transporting unit
66 turbine cooling unit
68 coolant
70 turbine generator configuration
72 channels
73 bearing
74 first impeller
75 rotor
76 tandem roller bearing configuration
77 second impeller
78 first guide wheel
79 stator
80 interim piece
81 second guide wheel
84 first and second impeller vane
86 recirculation vane
88 second guide wheel vane
90 first guide wheel vane
92 annular space

The invention claimed is:

1. A device for performing an Organic Rankine Cycle-process (ORC-process), comprising a first circular flow (16) in which a first process fluid (18) is conducted, the first circular flow (16) having
  an evaporator (14) for evaporating the first process fluid (18),
  an expansion machine (22) located downstream of the evaporator (14) for expanding the evaporated first process fluid (18), wherein the expansion machine (22) is connectable to a generator (26) for generating electrical energy,
  a first condenser (28) located downstream of the expansion machine (22) for condensing the expanded first process fluid (18),
  a first fluid energy machine (34) located downstream of the first condenser (28) for increasing the pressure of the condensed first process fluid (18) and for transporting the first process fluid (18) to the evaporator (14) that is located downstream of the first fluid energy machine (34), and
  a second circular flow (40) in which a second process fluid (42) is conducted through the first condenser (28) and is evaporated therein, wherein the second circular flow (40) comprises
    a second fluid energy machine (44) located downstream of the first condenser (28) for compressing the evaporated second process fluid (42),
    a second condenser (48) located downstream of the second fluid energy machine (44) for condensing the evaporated second process fluid (42), wherein the first process fluid (18) can flow through the second condenser (48), and
    a throttle (50) located downstream of the second condenser (48) for throttling the condensed second process fluid (42), wherein
  the expansion machine (22) is connectable with the generator (26) by a shaft (30) without a gearing mechanism,
  wherein an expansion tank (55) is located downstream of the expansion machine (22) for expanding the first process fluid (18), the expansion tank (55) comprising an expansion tank cooling unit (57), and
  wherein the expansion machine (22) is embodied as a turbine (24) and comprises a turbine housing (25) that is connectable to a generator housing (27) of the generator (26), wherein the generator housing comprises a generator cooling unit, and wherein the second process fluid (42) or a further process fluid (53) can flow through the generator cooling unit (29).

2. The device according to claim 1, wherein a bearing of the shaft (30) comprises a tandem roller bearing configuration (76).

3. The device according to claim 1, further comprising one or more further circular flows (52) in each of which the further process fluid (53) is conducted, the further process fluid or fluids (53) being heated by one or more first heat exchangers (54) through which the first process fluid (18) or fluids can flow, wherein the one or more further circular flows (52) comprise
  a further fluid energy machine (56) located downstream of the first heat exchanger (54) for compressing the heated further process fluid or fluids (53),
  a second heat exchanger (58) located downstream of the further fluid energy machine (56) for transferring heat from the compressed further process fluid or fluids (53) to the first process fluid (18), wherein the first process fluid (18) can flow through the second heat exchanger (58), and
  a further throttle (64) located downstream of the second heat exchanger (58) for throttling the condensed further process fluid or fluids (53).

4. A device for performing an Organic Rankine Cycle-process (ORC-process), comprising a first circular flow (16) in which a first process fluid (18) is conducted, the first circular flow (16) having
  an evaporator (14) for evaporating the first process fluid (18),
  an expansion machine (22) located downstream of the evaporator (14) for expanding the evaporated first process fluid (18), wherein the expansion machine (22) is connectable to a generator (26) for generating electrical energy,
  a first condenser (28) located downstream of the expansion machine (22) for condensing the expanded first process fluid (18),
  a first fluid energy machine (34) located downstream of the first condenser (28) for increasing the pressure of the condensed first process fluid (18) and for transporting the first process fluid (18) to the evaporator (14) that is located downstream of the first fluid energy machine (34), and a second circular flow (40) in which a second process fluid (42) is conducted through the first condenser (28) and is evaporated therein, wherein the second circular flow (40) comprises a second fluid energy machine (44) located downstream of the first condenser (28) for compressing the evaporated second process fluid (42), a second condenser (48) located downstream of the second fluid energy machine (44) for condensing the evaporated second process fluid (42), wherein the first process fluid (18) can flow through the second condenser (48), and a throttle (50) located downstream of the second condenser (48) for throttling the condensed second process fluid (42), wherein the expansion machine (22) is connectable with the generator (26) by a shaft (30) without a gearing mechanism, wherein the expansion machine (22) is embodied as a turbine (24) and comprises a turbine housing (25) that is connectable to a generator housing (27) of the generator (26), the generator housing comprising a generator cooling unit (29);

further comprising a first further circular flow (521) in which a first further process fluid (53) is conducted, the first further process fluid (53) flowing through the generator cooling unit (29) and being thereby heated, wherein the first further circular flow (521) comprises a further fluid energy machine (56) located downstream of the generator cooling unit (29) for compressing the heated first further process fluid (53), a second heat exchanger (58) located downstream of the further fluid energy machine (56) for transferring heat from the compressed first further process fluid (53) to the first process fluid (18), wherein the first process fluid (18) can flow through the second heat exchanger (58), and a further throttle (64) located downstream of the second heat exchanger (58) for throttling the condensed first further process fluid (53).

5. The device according to claim 4, wherein the turbine (24) comprises a first impeller (74) having a number of first impeller vanes (84), the first impeller (74) being arranged on the shaft (30) on which a rotor (75) of the generator (26) is arranged.

6. The device according to claim 5, wherein the turbine (24) comprises a first guide wheel (78) having a number of first guide wheel vanes (90) and a first impeller (74) having a number of first impeller vanes (84).

7. The device according to claim 6, wherein the turbine (24) comprises a second impeller (77) and a second guide wheel (82) having a number of recirculation vanes (86) and a number of second impeller vanes (84).

8. The device according to claim 4, wherein the turbine housing (25) comprises a turbine cooling unit (66).

9. A device for performing an Organic Rankine Cycle-process (ORC-process), comprising a first circular flow (16) in which a first process fluid (18) is conducted, the first circular flow (16) having an evaporator (14) for evaporating the first process fluid (18), an expansion machine (22) located downstream of the evaporator (14) for expanding the evaporated first process fluid (18), wherein the expansion machine (22) is connectable to a generator (26) for generating electrical energy, a first condenser (28) located downstream of the expansion machine (22) for condensing the expanded first process fluid (18), a first fluid energy machine (34) located downstream of the first condenser (28) for increasing the pressure of the condensed first process fluid (18) and for transporting the first process fluid (18) to the evaporator (14) that is located downstream of the first fluid energy machine (34), and a second circular flow (40) in which a second process fluid (42) is conducted through the first condenser (28) and is evaporated therein, wherein the second circular flow (40) comprises a second fluid energy machine (44) located downstream of the first condenser (28) for compressing the evaporated second process fluid (42), a second condenser (48) located downstream of the second fluid energy machine (44) for condensing the evaporated second process fluid (42), wherein the first process fluid (18) can flow through the second condenser (48), and a throttle (50) located downstream of the second condenser (48) for throttling the condensed second process fluid (42), wherein the expansion machine (22) is connectable with the generator (26) by a shaft (30) without a gearing mechanism, wherein the expansion machine (22) is embodied as a turbine (24) and comprises a turbine housing (25) that is connectable to a generator housing (27) of the generator (26), the generator housing comprising a generator cooling unit (29);

further comprising a first further circular flow (521) in which a first further process fluid (53) is conducted, the first further process fluid (53) flowing through a heat transporting unit (65) and being thereby heated, wherein the first further circular flow (521) comprises a further fluid energy machine (56) located downstream of the heat transporting unit (65) for compressing the heated first further process fluid (53), a second heat exchanger (58) located downstream of the further fluid energy machine (56) for transferring heat from the compressed first further process fluid (53) to the first process fluid (18), wherein the first process fluid (18) can flow through the second heat exchanger (58), a further throttle (64) located downstream of the second heat exchanger (58) for throttling the condensed first further process fluid (53), and a second further circular flow (522) in which a second further process fluid (532) is conducted that can flow through the generator cooling unit (29) and the heat transporting unit (65).

10. The device according to claim 9, wherein the expansion machine (22) is embodied as a turbine (24) and comprises a turbine housing (25) that is connectable to a generator housing (27) of the generator (26), wherein the turbine housing (25) comprises a turbine cooling unit (66) and wherein the second process fluid (42) or the further process fluid (53) can flow through the turbine cooling unit (66).

11. The device according to claim 9, wherein an expansion tank (55) is located downstream of the expansion machine (22) for expanding the first process fluid (18), the expansion tank having a cooling unit (57) and wherein the second process fluid (42) or the first further process fluid (53) can flow through the expansion tank cooling unit (7).

* * * * *